UNITED STATES PATENT OFFICE.

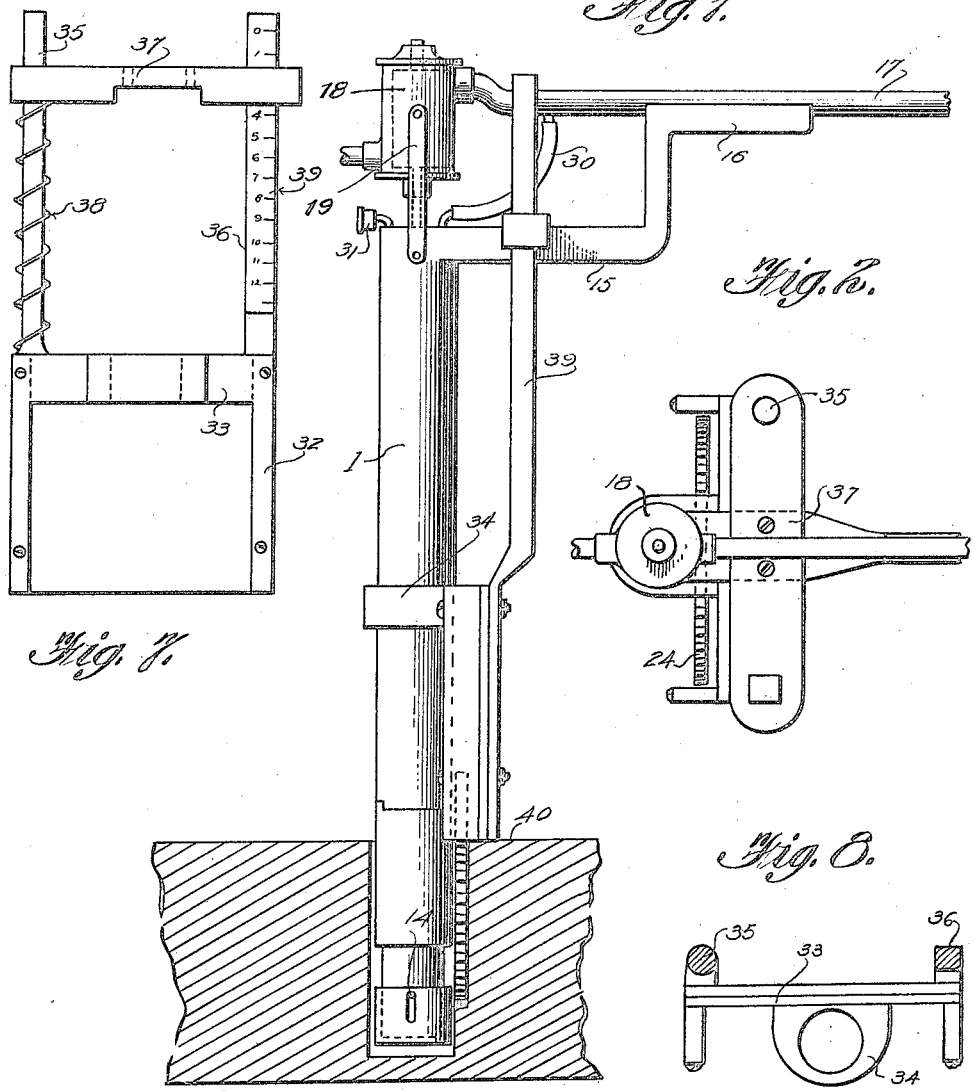

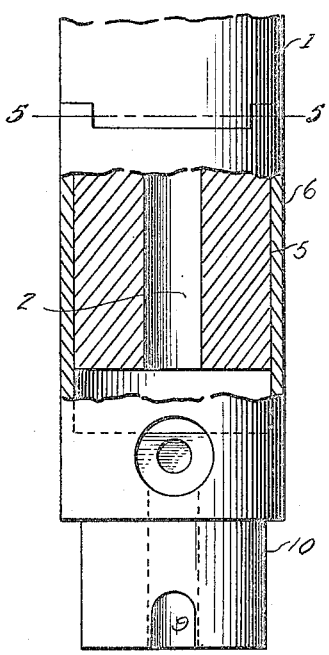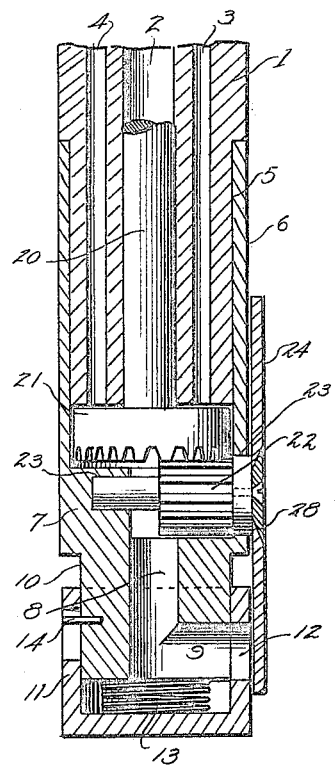

LOUIS C. HALVERSON, OF WINSLOW, WASHINGTON.

MORTISING MACHINERY.

1,403,241.                Specification of Letters Patent.    Patented Jan. 10, 1922.

Application filed March 24, 1921. Serial No. 455,209.

*To all whom it may concern:*

Be it known that I, LOUIS C. HALVERSON, a citizen of the United States, and residing at Winslow, in the county of Kitsap and State of Washington, have invented certain new and useful Improvements in Mortising Machinery, of which the following is a specification.

This invention is directed to an improvement in mortising machines, in the use of which the usual mortise may be readily and expeditiously cut.

The machine comprehends more particularly a portable apparatus adapted to readily convert a round opening formed with an appropriate tool into a square mortise through the use of a saw carried by the machine. The improvement contemplates a simple means for guarding the operator against injury from the saw and the use of the guard for indicating the cutting depth of the saw at any particular time, and further the provision of means whereby the saw is kept clear of obstructions, as saw dust and chips during the sawing operation.

In the drawings:—

Fig. 1 is an elevation of the improved machine.
Fig. 2 is a plan view of the same.
Fig. 3 is an enlarged elevation partly broken out of the lower portion of the machine, the saw being omitted.
Fig. 4 is a longitudinal section of the lower portion of the machine with parts in elevation, to illustrate the driving means for the saw.
Fig. 5 is a section on line 5—5 of Fig. 3.
Fig. 6 is a broken elevation illustrating the means for securing the saw in place.
Fig. 7 is an elevation of the guard.
Fig. 8 is a transverse section thereof.
Fig. 9 is a detail sectional view showing the manner of mounting the saw to the transverse shaft.

The improved mortising machine comprises a circular elongated body 1 formed with a central bore 2, and with smaller bores 3 and 4 extending longitudinally of the body from one end to the other. The lower end of the body is reduced at 5 to receive an extension 6 of a base portion 7, the latter underlying the body and having therein a bore 8 forming a continuation of the bore 2 of the body with a lateral channel 9 opening through one side of the base. The external diameter of the base is similar to that of the body, and the base is further reduced in diameter at its lower end at 10 to receive a cap 11, having an opening 12 communicating with the channel 9, the cap being spring pressed in one direction by spring 13 and prevented from disconnection from the base by a slot and pin connection 14.

The upper end of the body 1 is formed with an integral or connected handle portion 15 which has an off-set extension 16 longitudinally channeled to receive and support the surface pipe 17 leading to an air motor 18. The motor 18, which may be of any desired type and operated in any particular manner without departing from the spirit of the present invention, is supported immediately above the body by arms 19, and the drive shaft of said motor is connected, preferably by any acceptable type of separable connection, with the drive shaft 20 of the mortising machine. The shaft 20 extends longitudinally of and operates in the bore 2, and at the lower end is provided with a gear 21, as of the crown type, adapted to operate a pinion 22 supported in bearings 23 in the base 7. A saw 24 is connected directly to the pinion 22, the end of the pinion beyond the adjacent bearing 23 being provided with opposed lugs 25 over which the saw is fitted through an opening 26 therein, a securing strip 27 overlying the surface of the saw through under cut edges 28 and being secured between the lugs 25 and to the end of the pinion by a set screw 29. The bore or conduit 3 is connected at the upper end through a pipe 30 with the air surface pipe 17, so that there is a continual current of air directed through the conduit 3 around the gear connections through the bore 8, channel 9, and opening 12 to the operating or cutting point of the saw. This air current tends to keep the saw free of obstruction in the usual manner. The bore or conduit 4 is connected with a source of lubricant supply here shown as a grease cup 31 by which lubricant may be directed to the gearing and operating parts.

In connection with the mortising machine described, I provide a guard which will protect the user against liability of accident from the saw, and will at the same time indicate the depth at which the saw is cutting, to thereby enable the user to accurately gauge the depth of the mortise being cut. This guard comprises a rectangular frame structure 32 adapted to embrace the saw and having an upper cross bar 33 from which extends an eye-member 34 to slidably embrace the body 1.

Uprights 35 and 36 extend upwardly from the frame and pass through a cross bar 37 fitted to engage with and be temporarily secured to the handle portion 15. The upright 35 is adapted to pass slidably through the cross bar 37 and a coil spring 38 is arranged between the frame 33 and the cross bar 37, this spring encircling the upright 35. The upright 36 also slidably cooperates with the cross bar 37 and carries a series of gauge marks 39 arranged to register the cutting depth of the saw. The lower edge of the guard may, and preferably does rest upon the top of the work at 40, and as the body is moved downwardly, the gauge will of course rise, and while protecting the operator against contact with the saw, will, at the same time, through the gauge 39, indicate the depth at which the saw is operating below the surface 40.

The operation of the machine is obvious from the above description taken in connection with the drawings, it being apparent that following the boring of a hole in the material at the appropriate point, as by an auger or the like, the lower end of the machine is inserted in the hole, the projection of the cap 11 by the spring 13 serving to secure a sufficient projection below the bottom of the saw to permit a machine to be engaged in the hole before the saw engages the material. The tool is moved downwardly, the saw cutting the appropriate square portion, and following each cut, the tool is turned in an angle of 90° until the appropriate square mortise is obtained. As the cap reaches the bottom of the hole, it will yield under pressure on the tool to permit the saw to continue to cut until the cutting edge of the saw is on a line with the bottom of the tool. During the use of the saw, the chips and saw dust are blown therefrom in the manner described, permitting a free unobstructed operation.

Claims:

1. In a mortising machine, a circular body, a base removably secured on the lower end thereof, operating means arranged within the body and base, a saw mounted on said operating means beyond the body with the lower edge thereof projecting below the lower end of the base and adapted for operation by said means, and a spring projected cap mounted on the base and normally projecting beyond the lower edge of the saw to engage the work and form a guide in the initial application of the machine and yield so that the bottom of the cap is even with the bottom edge of the saw to permit the saw to finish a cut.

2. In a mortising machine, a body, a saw mounted for operation at the side of the body having its lower edge projecting below the lower end of the body, means carried by the body for operating the saw, and a yielding guide mounted on the body adapted to normally project below the lower edge of the saw for guiding the saw in beginning a cut and adapted to yield so that it will be even with the bottom edge of the saw to permit the saw to finish the bottom of a cut.

3. In a mortising machine, a circular body, a saw mounted for operation at the side of the body near the lower end thereof, means carried by the body for operating the saw, said body being formed with a handle extending laterally from the upper end thereof, a cross bar mounted on the handle, a saw guard axially movable on the body adapted to engage the work and cover the portion of the saw projecting above said work, uprights mounted on said guard and slidably extending through openings in the cross-bar, one of said uprights being provided with a scale so that the projection of the saw and body with respect to the work will be indicated on the scale on said upright.

4. In a mortising machine, a body formed with a central bore and two passages extending longitudinally therethrough, a shaft rotatably mounted in the central bore, power means mounted on the upper end of the body and connected with the shaft for rotating the same, a gear mounted on the lower end of the shaft, a base mounted on the lower end of the body, a shaft mounted transversely in the base and having gear teeth meshing with the above mentioned gear, a saw mounted on the end of the transverse shaft beyond the body and base, the base being formed with a passage opening adjacent the lower portion of the saw, and means for connecting one of the longitudinal passages at the upper end of the body with a source of air pressure whereby air is forced through the passage, around the gears, through the passage in the base and outwardly at the bottom of the saw for keeping the working parts in the body clean and blowing the chips being cut out of the path of the saw.

In testimony whereof I affix my signature.

LOUIS C. HALVERSON.